Dec. 29, 1942. M. NOWOTNY 2,306,464
ARTIFICIAL PLASTIC ANIMAL TEETH AND JAWS
Filed July 21, 1941

INVENTOR.
Monroe Nowotny
BY
Victor J. Evans & Co.
ATTORNEYS

Patented Dec. 29, 1942

2,306,464

UNITED STATES PATENT OFFICE 2,306,464

ARTIFICIAL PLASTIC ANIMAL TEETH AND JAWS

Monroe Nowotny, San Antonio, Tex.

Application July 21, 1941, Serial No. 403,451

4 Claims. (Cl. 35—20)

This invention relates to artificial plastic animal teeth and jaws and has for an object to provide jaw models for use in taxidermy or study, and in which the upper jaw with teeth is formed in one unit, and the lower jaw with teeth and tongue is formed in one unit, such construction being much stronger than conventional constructions in which the tongue and lower jaw are formed of separate units which must be fastened together and to the upper jaws at their posterior ends.

A further object is to provide a device of this character which may be placed as an entirety into the prepared head of a mounted animal, in which open jaws are to be simulated, and will have extensive abutting surfaces at the posterior ends of the units to prevent collapse or breakage of the units, and will also have suitable shoulders at the posterior ends to provide strong anchorage for the units in the prepared head of the animal.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1:
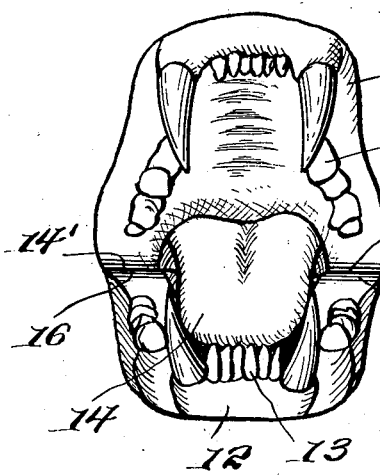
Figure 1 is a front elevation of artificial plastic animal teeth and jaws, constructed in accordance with the invention, assembled to simulate the open jaws of the natural animal.
Figure 2:
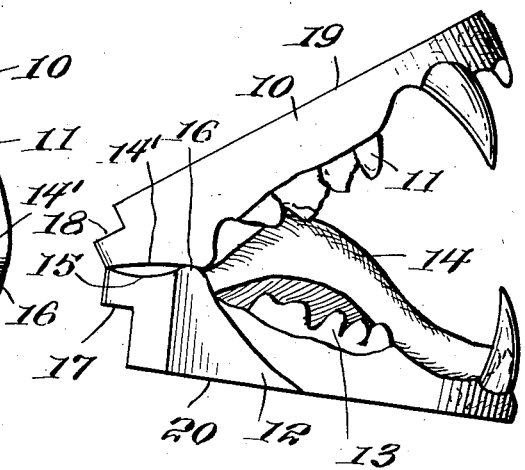
Figure 2 is a side elevation of the jaws shown in Figure 1.
Figure 3:
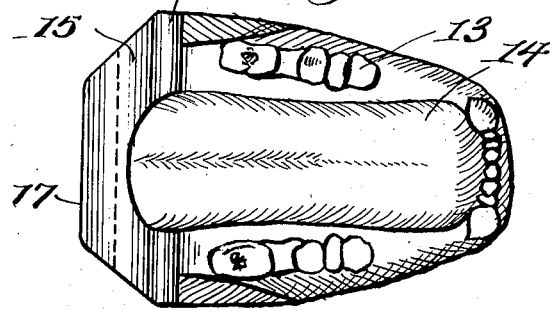
Figure 3 is a top plan view of the lower jaw, teeth and tongue formed in a single unit.

Referring now to the drawing in which like characters of reference designate similar parts in the various views, 10 designates the upper jaw with integral teeth 11 and 12 designates the lower jaw with integral teeth 13 and tongue 14.

In forming the jaws and the shape of the tissues and teeth, plastic material is used, comprising a mixture of "Catabond # 200CZ" or phenolic resin, hydrochloric acid and water. The material is placed in molds having impressions formed from natural animal jaws and so constructed that the lower posterior portion of the upper jaw will be provided with a convex surface 14 and the upper surface of the posterior portion of the lower jaw will be provided with a convex surface 15 terminating at the forward end in a transverse rib 16, both surfaces being juxtaposed to provide a strong firm abutment for holding the jaws in open position without danger of collapse or breakage of the jaws. The molds are further constructed so as to provide a rearwardly extending shoulder 17 at the posterior portion of the lower jaw and a rearwardly extending shoulder 18 at the posterior portion of the upper jaw, the first named shoulder facing downwardly and the other shoulder facing upwardly. These shoulders provide firm anchorages for any suitable material or to be used in any manikin made to represent any animal head or for receiving the bony structure of the prepared animal head to firmly anchor the jaws in place in the head, as an entirety, without danger of dislodgement or breakage of the jaws.

In the application of the jaws, it will be understood that the head or skull is properly prepared with a plastic material and the jaws are separately inserted in the mouth, so that the shoulders 17 and 18 are embedded therein with the ribs in proper engagement. When the skin surrounding the mouth is stretched over the jaws it has a tendency to separate the outer ends of the jaws and after the plastic material has hardened the jaws can not possibly move.

By forming the lower jaw 12, teeth 13 and tongue 14 as an integral unit a stronger structure is presented than where the tongue is a separate unit and must be fastened in place on the lower jaw and assembled with the upper jaw.

When the molds are filled with the plastic material the upper surface of the material will be flat or hollow to provide a surface 19 for the upper jaw and a flat lower surface 20 for the lower jaw. These surfaces may be fastened in any preferred manner to the bony structure or manikin of the prepared animal head and will provide firm strong anchorage surfaces for the jaws.

From the above description it is thought that the construction and operation of the invention will be fully understood without further explanation.

What is claimed is:

1. An artificial model structure for taxidermists comprising, a one piece upper member simulating an animal upper jaw with integral teeth and tissues, and a one piece lower member simulating the lower jaw and tongue of said animal, teeth and tissues, the members having abutting supporting surfaces at their posterior ends holding the members in position to simulate the open mouth of an animal.

2. The structure as of claim 1 and in which the posterior ends of the jaws terminate in shoulders, the shoulder of the upper jaw facing upwardly and the shoulder of the lower jaw facing downwardly, said shoulders being adapted to be secured to the bony structure of a prepared animal head.

3. An artificial model structure for taxidermists, comprising a one piece upper member simulating an animal upper jaw with integral teeth and tissues, and a one piece lower member simulating the lower jaw and tongue of said animal, teeth and tissue formed integral therewith, the members having abutting supporting surfaces at their posterior ends, the supporting surface of the upper member arranged at an angle for holding the members in a position to simulate the open mouth of an animal.

4. An artificial model structure for taxidermists, comprising a one piece upper member simulating an animal upper jaw with integral teeth and tissues, a one piece lower member simulating the lower jaw and tongue of said animal, teeth and tissue formed integral therewith, the lower member having a concave supporting surface terminating at its front end in a transverse rib, and the upper member having a concave surface extending in a plane at an angle to the member and disposed in bridging position on the rib and the concave surface of the lower member.

MONROE NOWOTNY.